UNITED STATES PATENT OFFICE.

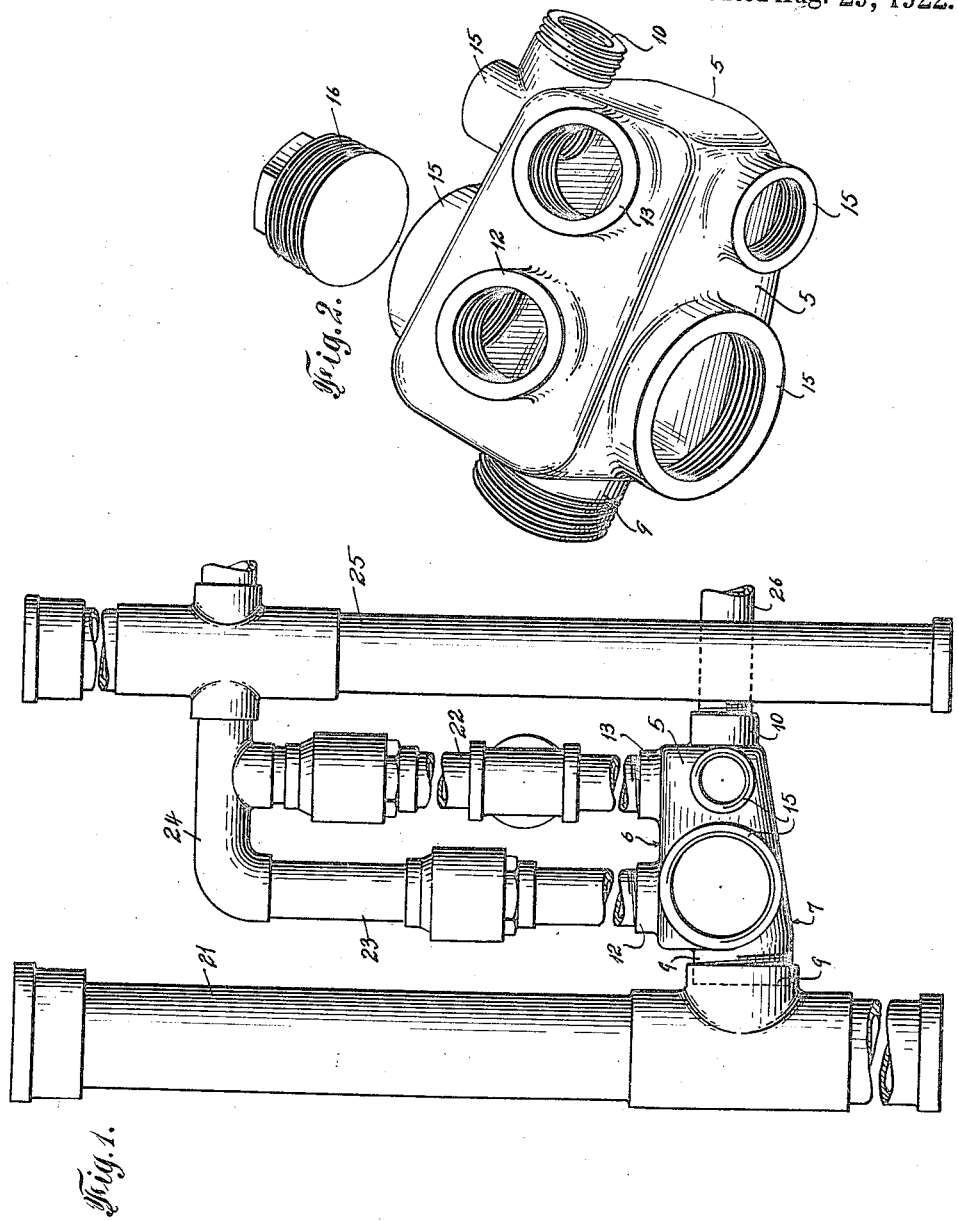

BENJAMIN KAPLAN, OF NEW YORK, N. Y.

WASTE AND VENT PIPE FITTING.

1,427,107.   Specification of Letters Patent.   Patented Aug. 29, 1922.

Application filed December 21, 1921. Serial No. 523,967.

*To all whom it may concern:*

Be it known that I, BENJAMIN KAPLAN, a citizen of the United States, residing at New York, borough of Bronx, in the county of Bronx and State of New York, have invented certain new and useful Improvements in Waste and Vent Pipe Fittings, of which the following is a specification.

This invention relates to plumbing and piping systems, and more particularly to improvements in waste and vent pipe fittings used in connection with pipe systems.

An object of this invention is to produce such improvements in the construction of waste and vent pipe fittings as to enable the manufacturer to materially reduce the number of fittings now carried in stock; and furthermore, it is an object to so standardize and unify various fittings into one and a single device, that a single fitting as herein disclosed fulfills the requirements and takes the place of necessarily large number of pipe fittings now manufactured and carried in stock by plumbing supply concerns.

In the usual run of building construction, it happens that piping and plumbing systems, bathroom and laundry installations, sink and water equipments, are all so variable in design, size, style and equipment, that it necessarily follows that plumbers and contractors require a very large variety and assortment of waste and vent pipe fittings for use in connecting up bathroom fixtures, sink and water fixtures with the soil pipe and vent pipe.

It is fitting, therefore, that the primary object of my invention is as above described, to the end that the manufacture of plumbing supplies, and the installation thereof, is simplified and made less expensive.

The accompanying drawings illustrate an embodiment of my invention, and though there is shown a preferred form of construction, I claim the right of protection as to all such changes as may properly come within the scope of my invention.

In the drawings, Figure 1 shows an assembly view of my waste and vent pipe fitting in side elevation, illustrating how the soil pipe and vent pipe are connected through my universal one type and style fitting.

Figure 2 illustrates a perspective view of the pipe fitting as removed from the piping system to show the construction thereof.

In disclosing a more detailed description of my invention, I will first describe the construction of the pipe fitting itself and thereafter explain its uses in connection with the pipe system.

The waste and vent pipe fitting comprises a main body 5, which is hollow and which has a plurality of threaded ducts or hubs to receive pipes. The body 5 is usually manufactured in the form of a casting, and it is preferable to form the upper surface 6 parallel with the axis of the body, and make the lower surface 7 thereof on an angle so as to slope upwardly the lower surface from the soil pipe to the outer small end of the body. By constructing the top surface flat and the bottom portion of the fitting on an angle, or made tapered as shown and described, it facilitates the draining of water through the fitting.

The inner large end of the fitting is made with a threaded neck 9 cast integral with the body 5 and tangential to the lower sloping arcuate wall of the body, and this construction places the top cylindrical wall of the neck somewhat below the upper horizontal surface 6 of the body. The outer and smaller end of the body 5 is provided with a threaded duct 10. This duct is offset from the body 5 such that its axis is spaced from and parallel to the axis of the body 5. In order to make a shapely and neat fitting, the cylindrical wall of the duct 10 tapers inwardly and merges into the wall of the body 5.

On the upper horizontal surface 6 of the body, there is provided several, usually two, ducts 12 and 13. These ducts, or pipe opening connections, are usually threaded internally to join with the various pipes leading upwardly to a vent pipe connection.

Lateral ducts or pipe connections 15 are made integral on both sides of the body 5; and it is preferred that the duct or flange on the larger end, be large in diameter, while the duct on the outer smaller end be made relatively small in diameter for the purpose of receiving pipe connections from sinks, bathtubs and other fixtures. This type of waste and vent pipe connection is preferably made with threaded connections and ducts to join with other pipes so that packed pipe connections are avoided.

It is pointed out that a large number and assortment of holes and pipe connection ducts are made on this pipe fitting; and furthermore, the ducts are provided on both sides thereof so that the fitting for all practical purposes is a right and left hand fitting.

This pipe fitting is made with ducts extending laterally from each side of the body in order that the device be universal in character and fulfill the requirements of both a right and left fitting; and it therefore follows that the unused side of the fitting must necessarily be plugged up. Inasmuch as building construction and plumbing installations seldom require pipe connections from both sides of a waste fitting, there is provided one or more threaded plugs 16 which are screwed into the unused ducts to close off the side of the waste fitting not used.

In the use of this pipe fitting and its assembly with piping and plumbing systems, reference is made to Figure 1, where the duct neck 9 is connected into the soil pipe 21. Pipes 22 and 23 are joined to the ducts 12 and 13 on the fitting 5, and are joined to a fitting 24 which connects to the main vent pipe 25.

The soil pipe 21 and vent pipe 25 extend upwardly through the floors of a building and on every floor a drainage fitting 5 is installed. The drainage fitting 5 is disposed between the spaced pipes 21 and 25 and therefore occupy little unused space. In a similar manner the two pipes 22 and 23 are located between the soil and vent pipe; and inasmuch as the axes of the fitting 5 and the vent pipe are both in the same plane, it is necessary to offset, as hereinbefore described, the duct 10 in order that a pipe 26 pass by the vent pipe and connect with the fitting 5.

In the use of this drainage fitting, the two or more side ducts 15 provide adequate connecting facilities to join the soil pipe with the bathtub, water sink, and other plumbing accessories; and in case only one pipe connection is employed it is only necessary that a plug 16 be used to close the other duct. In some plumbing installations, it is necessary to lead a bathtub connection or water sink connection around the vent pipe, and in such a case the pipe 26 joins the tub with the drainage fitting.

One of the special advantages in this fitting is the aforesaid duct 10 provides a connection between the pipe 26 and fitting without requiring an elbow joint or curved part to lead around the vent pipe 25. In present day piping systems, the means provided for leading a pipe around the vent pipe is somewhat awkward due to the several parts required; but in my pipe fitting, this work is greatly simplified.

Furthermore, the water flowing from the pipe 26, and water flowing from other pipes into the ducts 15, empties freely through the fitting into the soil pipe 21 because of the tapered design of the fitting which always insures complete drainage of water from the device.

The manufacture and use of this fitting simplifies plumbing work and sales of plumber's materials because it largely reduces the number of right and left hand fittings and eliminates elbow connections now necessarily carried by plumbing supply houses.

Having described the construction of the fitting, what I desire to secure by Letters Patent is:

1. A waste and vent fitting consisting of an elongated hollow body provided with outlet openings at each end by which pipes are joined to the fitting, the top wall of the fitting being made parallel to the axis of the fitting and the bottom wall being sloped downwardly from one end to the other end, one of the aforesaid end openings being offset from the other opening, the said body provided with suitable pipe ducts by which connection is established with a vent pipe, and provided with right and left hand pipe ducts by which connection is established with bathtub, water, and sink fixtures.

2. Improvements in plumbing and piping systems comprising parallel soil and waste pipes, a drainage fitting disposed therebetween and connecting with the pipes, pipes approaching the fitting from either or both sides and joining the fitting with a tub, sink or other water fixtures, provision for closing off one side of the fitting so that a standard fitting will be usable in any plumbing installation, and an off set pipe connection established with the fitting across the vent or soil pipe.

3. A vent pipe fitting consisting of an elongated hollow body provided with outlet openings at each end by which pipes are joined to the fitting, one of the aforesaid end openings being off-set from the opening on the other end, pipe ducts made on the body by which connection is established with a vent pipe, and pipe duct connections made on the body by which connection is established with bathtub, water, and sink fixtures.

In testimony whereof I have set my hand and seal this 15th day of December, 1921, in New York, county of Bronx, borough of Bronx, and State of New York.

BENJAMIN KAPLAN. [L. S.]